May 22, 1951  F. BUCHHORN  2,554,322
LIQUID COOLING DEVICE
Filed June 13, 1947  9 Sheets-Sheet 1

INVENTOR
*Fred Buchhorn*
BY
ATTORNEY

May 22, 1951　　　　F. BUCHHORN　　　　2,554,322
LIQUID COOLING DEVICE

Filed June 13, 1947　　　　　　　　　　9 Sheets-Sheet 2

Fig.3

INVENTOR
Fred Buchhorn
BY
ATTORNEY

May 22, 1951 F. BUCHHORN 2,554,322
LIQUID COOLING DEVICE
Filed June 13, 1947 9 Sheets-Sheet 3

INVENTOR
Fred Buchhorn
BY
his ATTORNEY

May 22, 1951 — F. BUCHHORN — 2,554,322
LIQUID COOLING DEVICE
Filed June 13, 1947 — 9 Sheets-Sheet 4

Fig. 6

INVENTOR
Fred Buchhorn
BY
ATTORNEY

May 22, 1951        F. BUCHHORN        2,554,322
LIQUID COOLING DEVICE
Filed June 13, 1947                      9 Sheets-Sheet 5

INVENTOR
Fred Buchhorn
BY
ATTORNEY

May 22, 1951 F. BUCHHORN 2,554,322
LIQUID COOLING DEVICE
Filed June 13, 1947 9 Sheets-Sheet 7

Fig. 9

INVENTOR
Fred Buchhorn
BY
his ATTORNEY

May 22, 1951        F. BUCHHORN        2,554,322
LIQUID COOLING DEVICE

Filed June 13, 1947        9 Sheets-Sheet 8

*Fig. 10*

INVENTOR
*Fred Buchhorn*
BY
ATTORNEY

May 22, 1951  F. BUCHHORN  2,554,322
LIQUID COOLING DEVICE
Filed June 13, 1947  9 Sheets-Sheet 9

INVENTOR
Fred Buchhorn
BY
ATTORNEY

Patented May 22, 1951

2,554,322

UNITED STATES PATENT OFFICE 2,554,322

LIQUID COOLING DEVICE

Fred Buchhorn, Jackson Heights, N. Y.

Application June 13, 1947, Serial No. 754,563

3 Claims. (Cl. 62—141)

My invention relates to refrigerating devices and refers particularly to devices adapted for the refrigeration of beer and similar products.

One object of my invention is refrigerating devices in which the refrigerant is carried by copper pipes and the liquid to be treated is carried in tin pipes.

Another object of my invention is refrigerating devices in which the refrigerant-carrying pipes are in a different compartment of the device from the liquid-carrying pipes.

Another object of my invention is refrigerating devices in which the refrigerant-carrying pipes are separated from the liquid-carrying pipes by means of a thermal conducting partition.

Another object of my invention is refrigerating devices in which the refrigerant-carrying pipes will not be coated with ice during the continued operation of the device.

Another object of my invention is refrigerating devices in which there is no electrolysis between the refrigerant-carrying pipes and the liquid-carrying pipes.

Another object of my invention is refrigerating devices in which the temperature of the liquid may be retained for a considerable length of time after the interruption of the flow of the refrigerant.

Another object of my invention is refrigerating devices which can be rapidly defrosted.

Another object of my invention is refrigerating devices in which the temperature produced by the refrigerant will be uniformly and evenly distributed upon the liquid-carrying pipes.

Another object of my invention is refrigerating devices in which a considerable decrease in pipage may be employed over that necessary in the present used devices.

Another object of my invention is refrigerating devices in which all exposed members may be readily cleaned.

Another object of my invention is refrigerating devices in which a uniform temperature of liquid may be withdrawn during a continued series of intermittent withdrawals thereof.

The transfer of beer from its container to the individual consumer seems simple, there are in fact, however, a number of specific conditions which must be observed and controlled in order that the beer may retain its original properties of taste.

The condition affecting the properties of beer have been the subject of intense chemical and mechanical investigations in order that it may retain its desirable properties until and during its consumption.

It has been determined that the properties of beer may be affected by repeated changes of temperature, by its temperature at the time of consumption, by the material of its containers, by the pressure under which it is maintained and by many other constant and variable conditions.

The production and retention of the correct properties of beer at the point of its delivery for individual consumption assume that these properties are present in the beer in the containers from which it is withdrawn, and, hence, such devices must be of such character and construction as to insure that the delivered beer has the properties present in the containers from which it is withdrawn.

It is evident, therefore, that the construction of such delivery devices is of the greatest importance.

The following properties are among those which are necessary in the delivery of proper beer.

The proper temperature of the beer must be preserved as nearly as possible and hence the device must be of such construction that the temperature of the beer in its container is produced and maintained during its passage through the device.

This maintenance of the proper temperature requires a refrigeration of the beer through the device and as both the beer and the refrigerant are affected by certain metals, it is necessary that the pipes through which both of these liquids are conveyed must be composed of materials which are not affected by the liquids and which do not affect the liquids.

Further, as some metals produce an electrolysis condition if brought into contact with each other physically or through a connecting medium, it is essential that the metals of the device should be of such character and position with respect to each other as to prevent this effect.

As beer delivery devices are usually installed in bars where there is more or less a constant withdrawal of beer, it is essential that the device be of such construction that the beer should always be of the desired temperature irrespective of the rapidity of its intermittent withdrawals.

As ice will form upon the outside of the pipe which contains the refrigerant, and as it is difficult to remove such ice, an operation which must be performed repeatedly, the construction of the device should be such that the deposit of such ice is avoided.

As the production and maintenance of the desired temperature of beer should be obtained in a minimum length of the beer-carrying pipe, it is essential that the cooling effect of the refrigerant should be exercised upon as great a length of such beer-carrying pipe as is possible.

The above mentioned desirable properties of devices of the character of my invention are cited from among the many requirements incident to a successful beer refrigerating device.

The devices of my invention possess all of the above mentioned, and other, valuable features as will be evident upon a consideration of my application and its accompanying drawings.

In the accompanying drawings illustrating one form of a device of my invention, similar parts are designated by similar numerals.

The particular form of a device of my invention shown in the accompanying drawings comprises an outer casing having the back 1, the sides 2 and 3, the bottom 4, the two front members 5 and 6, the front member 6 being positioned forwardly of the front member 5, the removable top member 7 having a plurality of openings 9, 9 therethrough and the removable tray-shaped top member 8 having a plurality of openings 15, 15 therethrough.

A flat sheet of metal 10 is positioned below the top member 7 and spaced from the sides of said top member 7. A flanged member 11 spaced from the sides of the top member 7 forms a gutter 12 within the top member, the floor of said gutter 12 having an opening 13 therein.

It is evident, therefore, that any excess of liquid overflowing a receptacle placed upon the cover 7 will flow through the openings 9, 9 into the gutter 12 and outwardly through the opening 13 into a drain pipe connected therewith.

Any liquid overflowing during the introduction of a liquid in filling containers resting on the tray-shaped top member 8 will pass through the openings 15, 15 therein through an opening 14 in the bottom thereof, into the tray 16, through the opening 17 therein and through the drain pipe 17a.

Two divisional portions of the interior of the device are formed by the metal wall 18 having thermal conductivity. The refrigerating pipe 19 is fixedly attached to the inner face of the wall 18 by any satisfactory means, preferably by soldering. While various means may be employed for insulating the pipe 19 within the chamber A, in the particular form of the device shown in the accompanying drawings, a sheet of rubberoid 20 having its faces covered with a coating of asphalt is then positioned parallel to the metal member 18 and spaced therefrom forming a chamber A. The inner face of the metal member 18 and all of the exposed portions of the pipe 19 are covered with a coating of asphalt. There is thus formed a refrigerant chamber A all of the surfaces of which are covered by a thermal insulator. It will be noted, however, that that portion of the pipe 19 abutting upon the metal member 18 and that portion of the solder abutting upon the member 18 are not covered with the asphalt and hence the temperature of the pipe 19 is conveyed directly to the thermal conducting member 18 and thence into the chamber containing the beer pipes to be described later.

A cork member 21 covered with asphalt is placed in abutment with the rubberoid member 20, and a sheet of rubberoid covered with asphalt 22 is placed in abutment with the cork member 21, the outer face of the member 22 abutting upon the inner face of the asphalt covered back member 1.

It will thus be seen that ice can not accumulate upon the refrigerating pipe 19 and that all of the refrigeration temperature within the pipe 19 will be transmitted to the refrigerating chamber B, described later, through the metal wall 18.

The refrigerating unit B, the portion of the device in which the liquid is cooled, is constructed as follows: the refrigerating pipe 19 is extended downwardly to a refrigerating unit, not shown as such units are well known and are not a part of my invention.

Figures 1, 2:
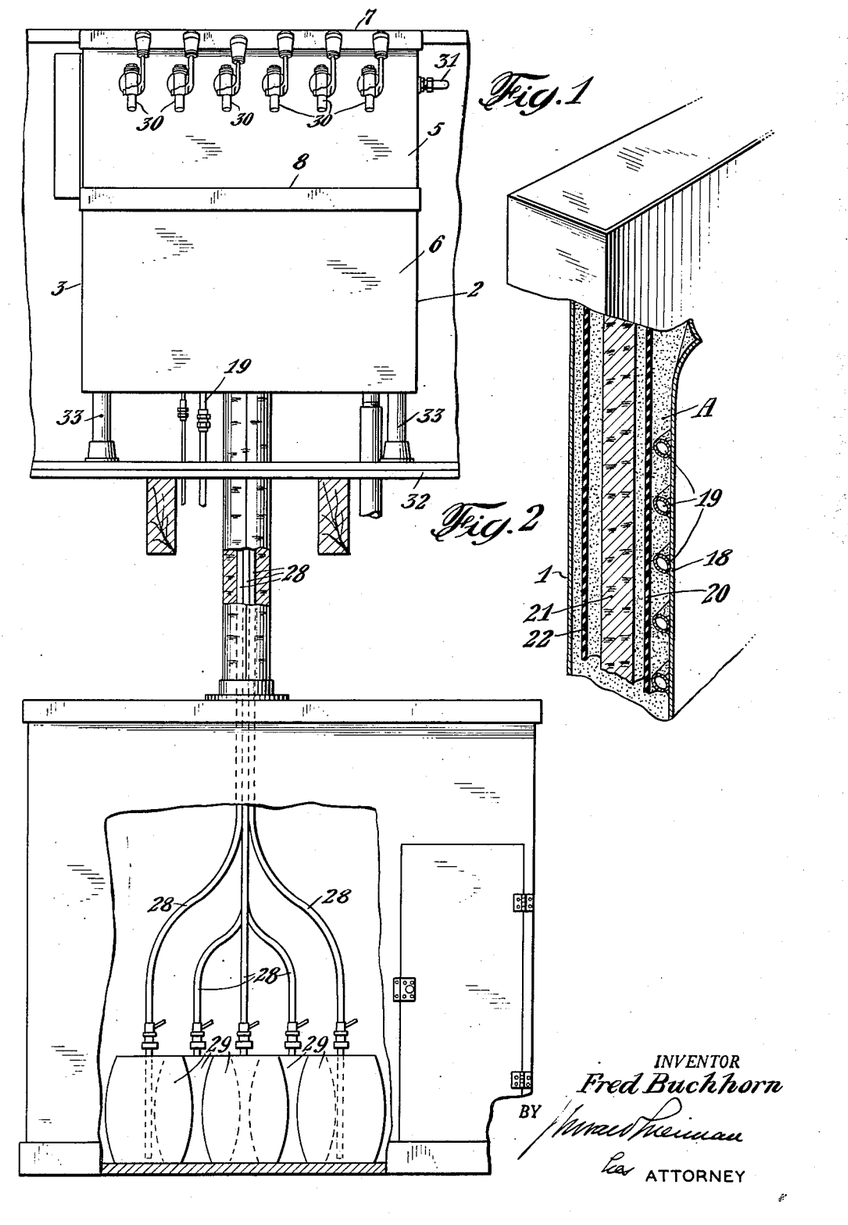
Figure 1 is a front view of one form of a device of my invention.
Figure 2 is an enlarged perspective view of a portion of the device of Figure 1, partly broken away to illustrate an insulated portion of the device.
Figure 3:
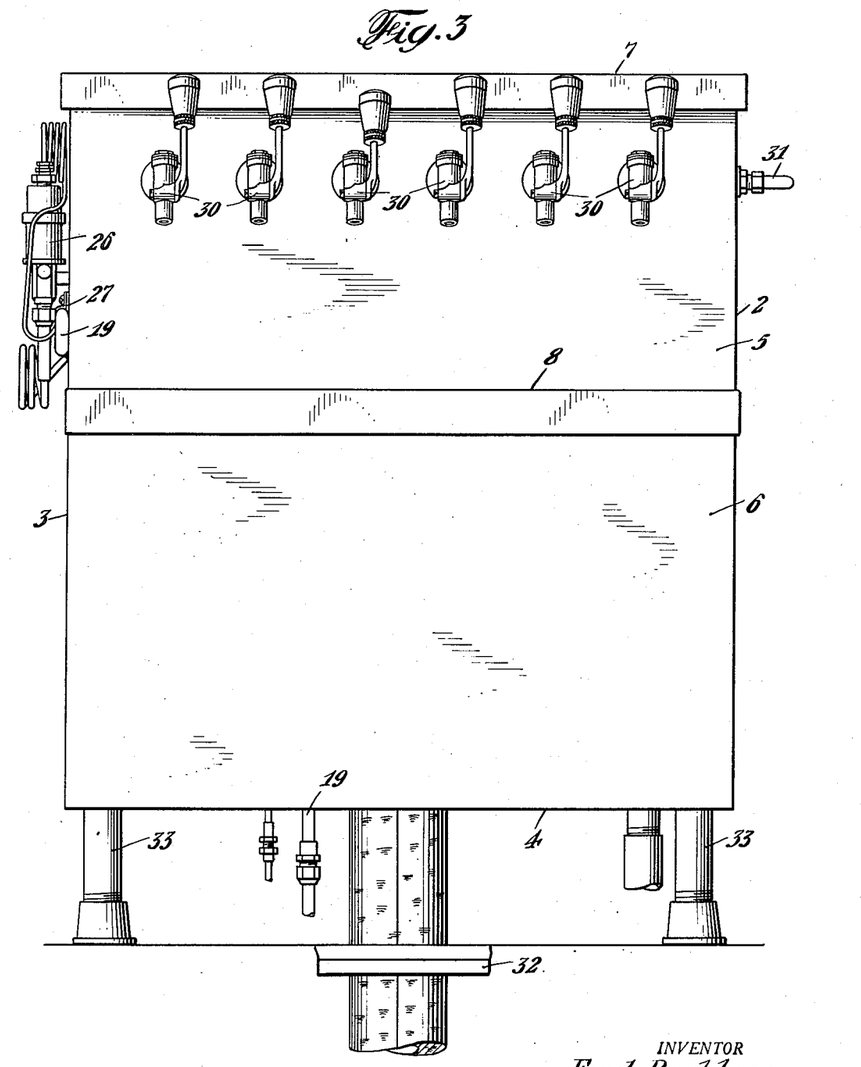
Figure 3 is an enlarged front view of the upper portion of the device of Figure 1.
Figure 4:
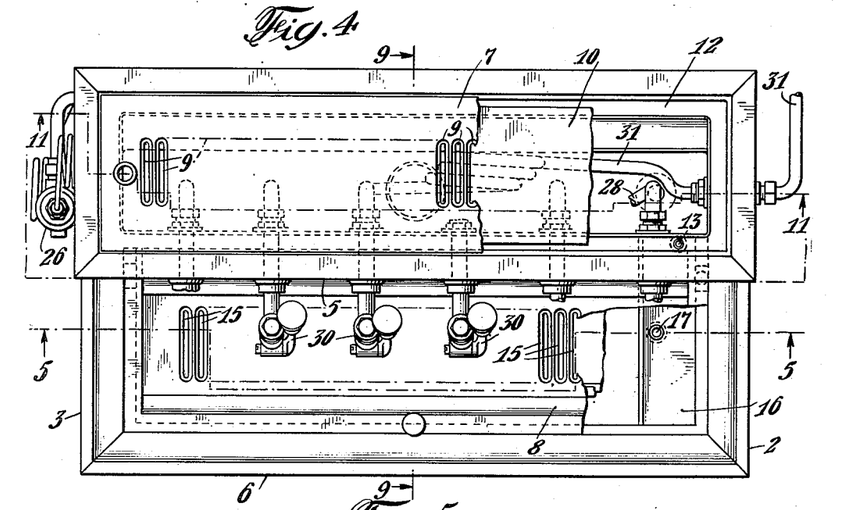
Figure 4 is a top view of the device of Figure 1 partly broken away for purposes of description.
Figures 5, 5A:
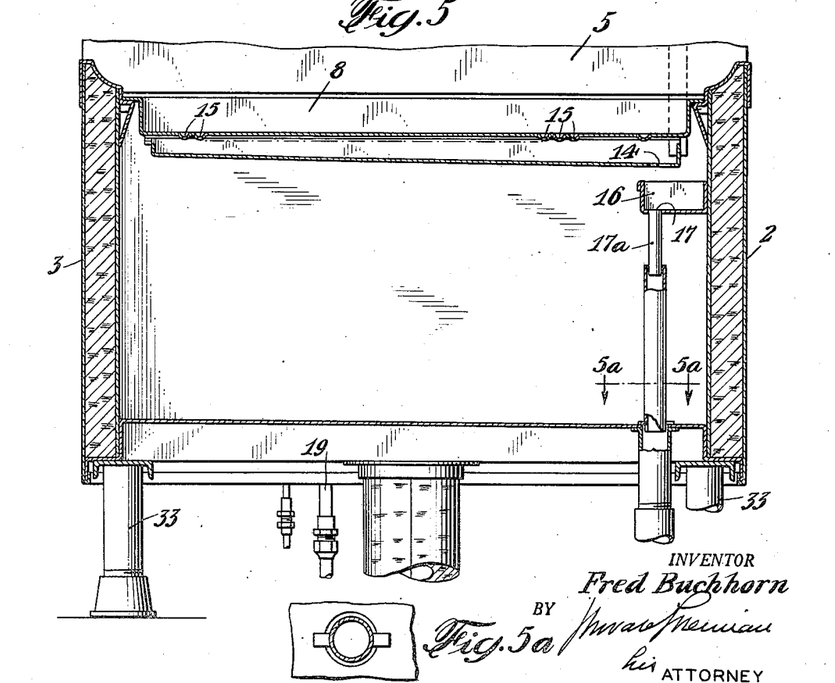
Figure 5 is a section through the line 5—5 of Figure 4.
Figure 5a is a section through the line 5a—5a of Figure 5.
Figure 6:
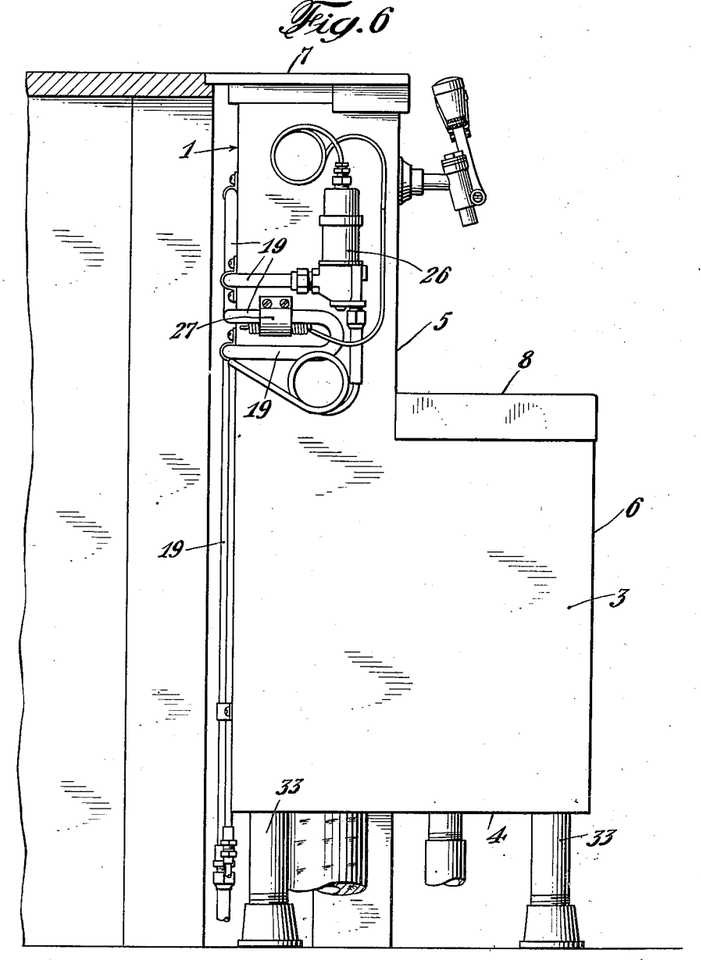
Figure 6 is a view of one side of the front portion of the device of Figure 1.
Figure 7:
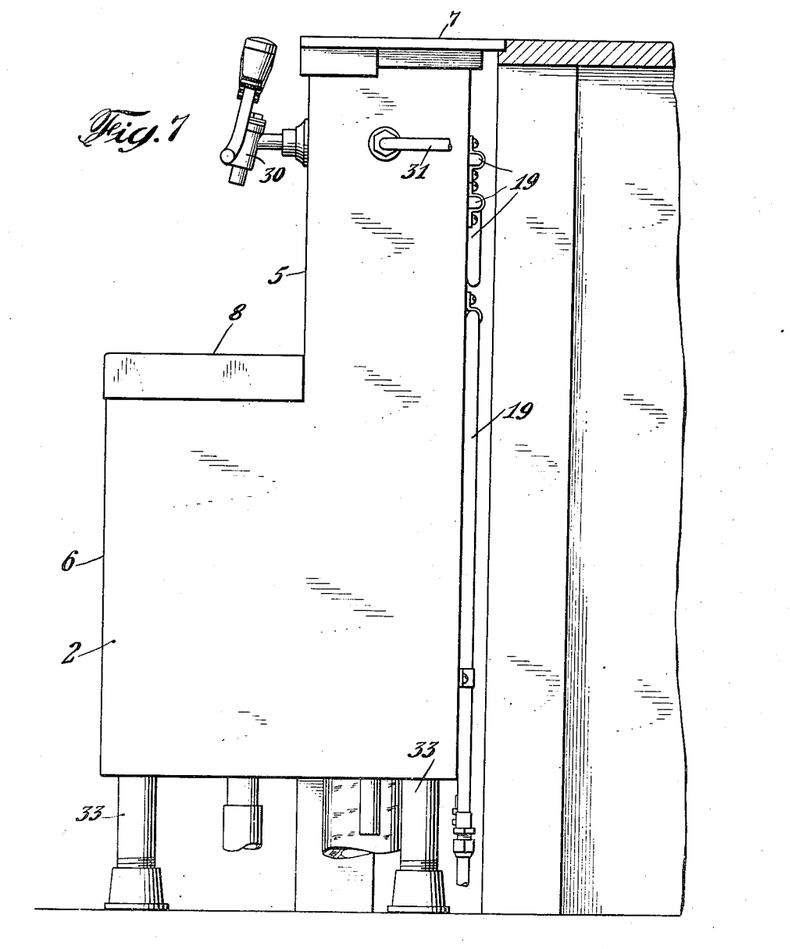
Figure 7 is a view of the other side of the front portion of the device of Figure 1.
Figure 8:
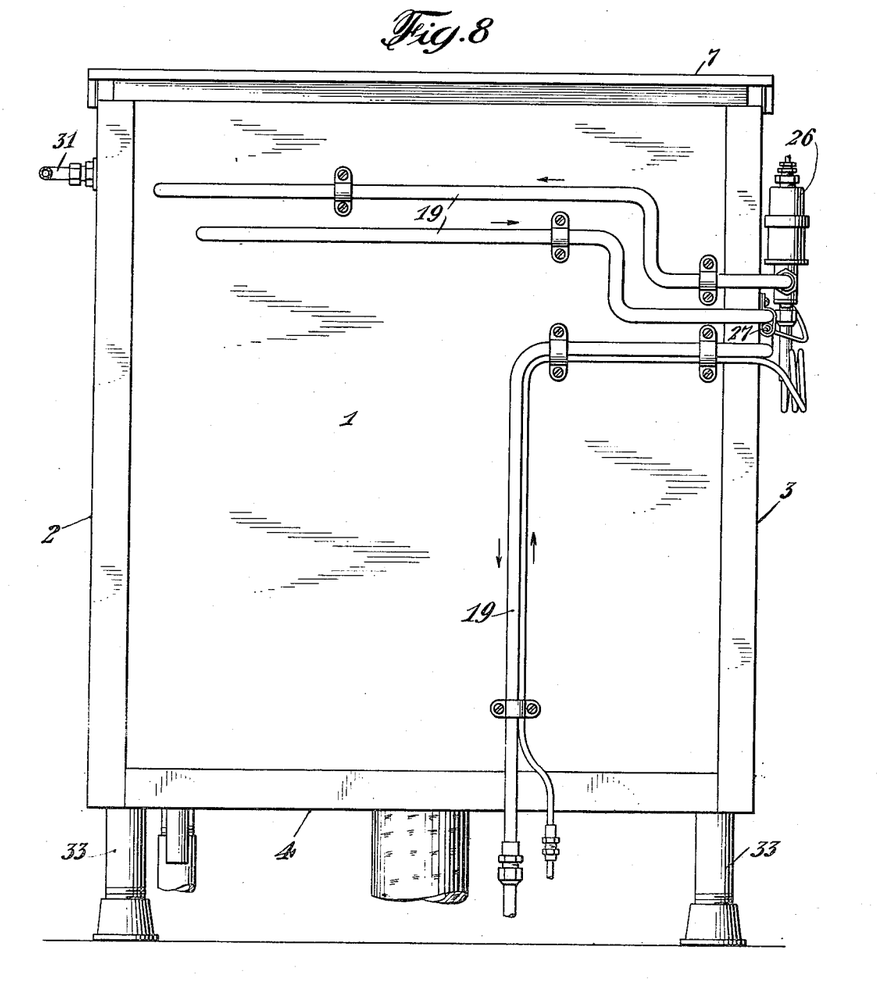
Figure 8 is a back view of the device of Figure 1.
Figure 9:
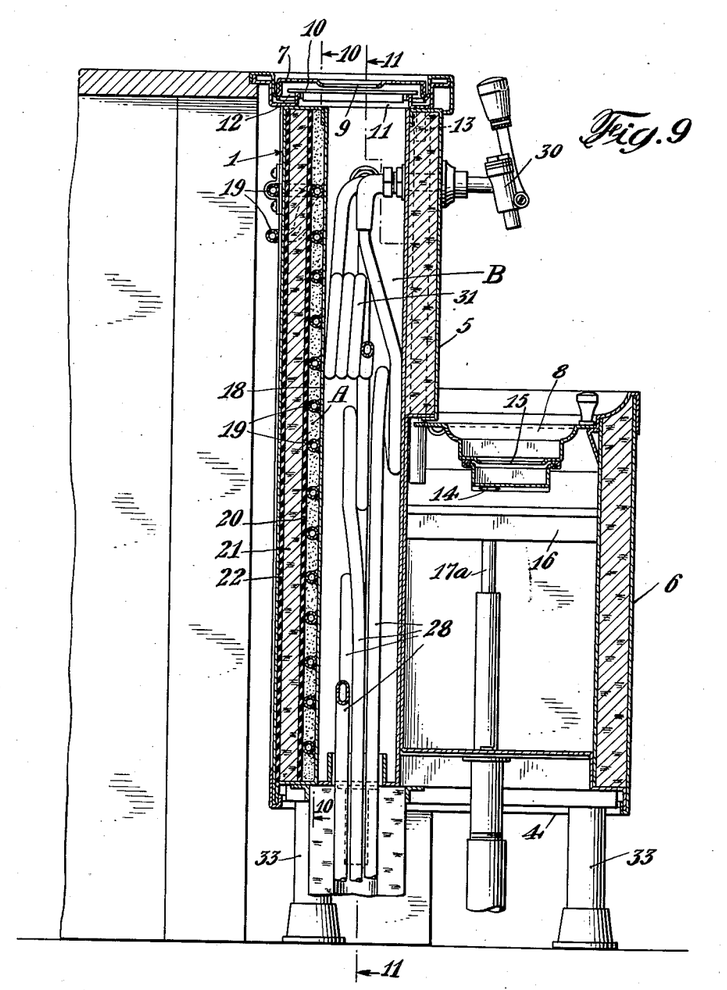
Figure 9 is a section through the line 9—9 of Figure 4.
Figure 10:
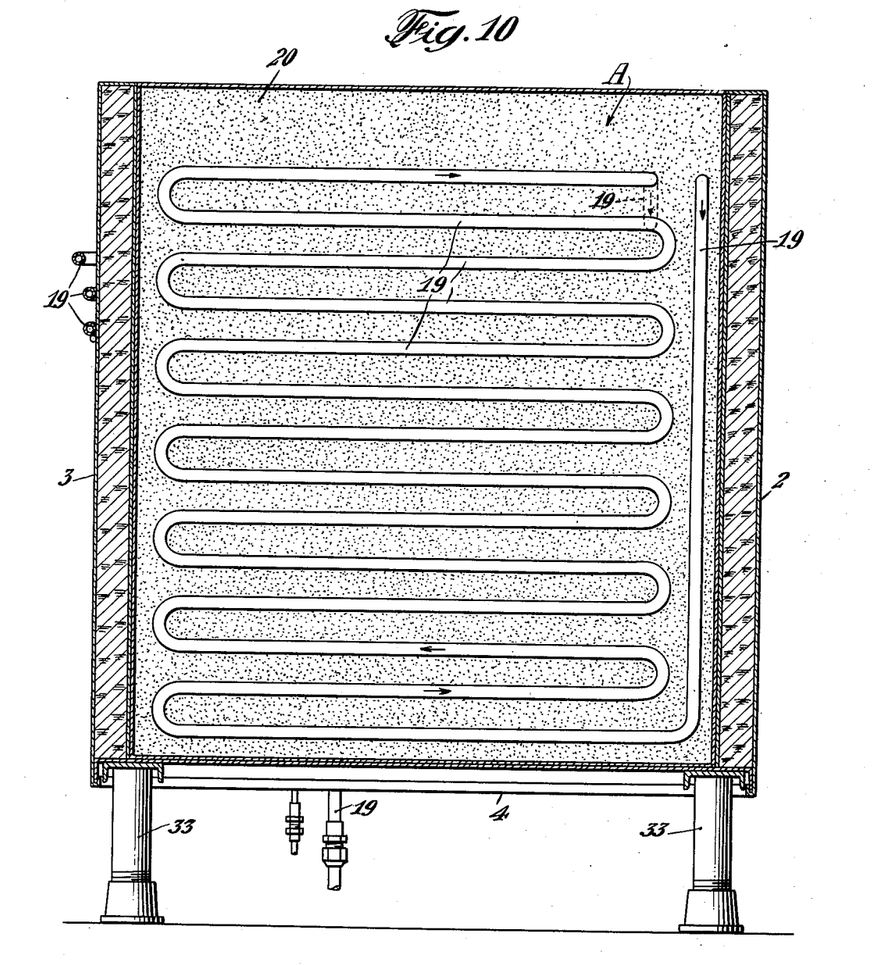
Figure 10 is a section through the line 10—10 of Figure 9 with upper part of tray removed.
Figure 11:
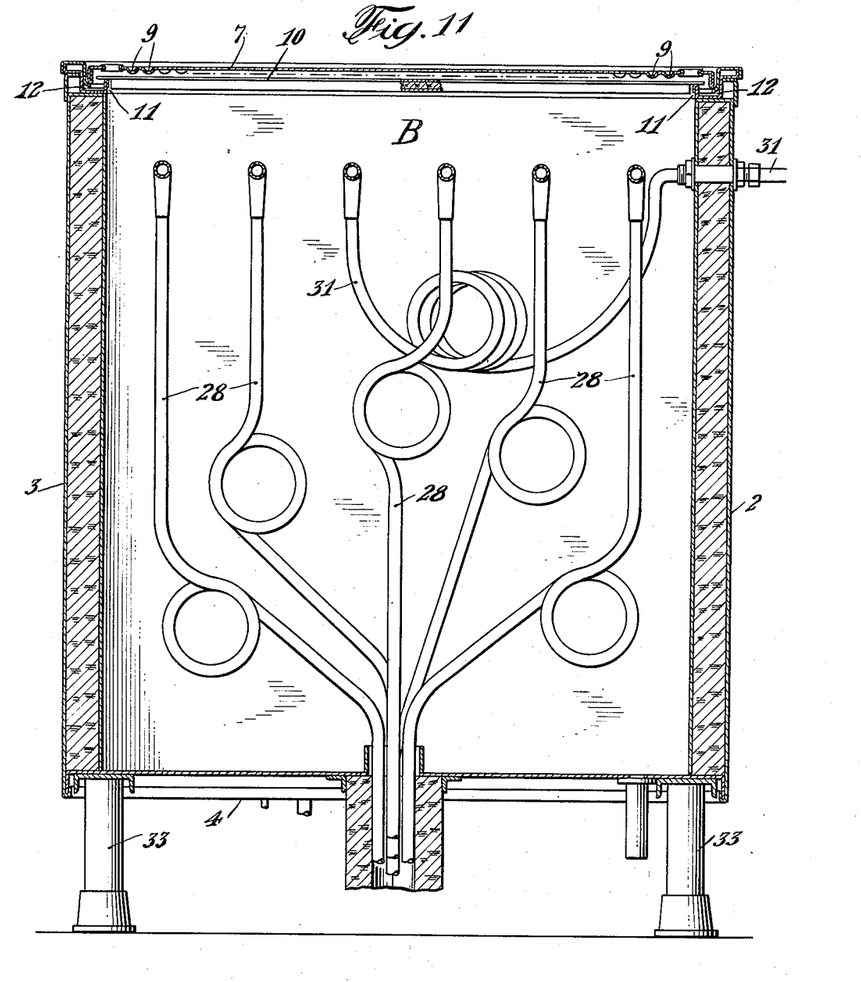
Figure 11 is a section through the line 11—11 of Figure 4 and through the line 11—11 of Figure 9.

The refrigerating liquid passes upwardly as shown particularly in Figures 6 and 8 into a thermostatic expansion valve 26, thence along the back member 1, as shown in Figure 8, thence inwardly into the upper portion of the refrigerant chamber A, and downwardly to the bottom portion thereof thence upwardly therein, thus allowing the system to be continually filled with the refrigerant. The pipe 19 then passes outwardly from the upper portion of the insulating chamber A and downwardly as a return to the refrigerating unit to produce a continuous movement of refrigerant liquid.

During the return movement of the refrigerant liquid it passes through a thermostatic bulb 27.

The movement of the beer from its container to the delivery exit is as follows: each beer pipe 28 enters a beer container 29 in a storage room, or "Walk-in Box," the temperature of said room, or box, being maintained at the desired temperature, any convenient pressure within the container being obtained by any well known suitable means.

The beer passes upwardly through the pipe 28 into the chamber B and all of the pipes 28, 28 exterior of the refrigerating chamber B are properly insulated. The beer pipe 28 is connected with the delivery valve 30.

If desired, cold water may be delivered through the delivery valve 30, as indicated in the accompanying drawings. In this event the pipe 31 is attached to a source of water supply passing through an opening into the chamber B and thence through a series of coils to one of the delivery valves 30.

My device as shown is supported upon a floor 32 by means of supports 33, 33.

It will be noted from the foregoing that the following are among the advantages of the devices of my invention:

A. No ice will be formed upon the refrigerant pipes.

B. That the period of defrosting is reduced to a minimum because there are no refrigerant pipes to be defrosted.

C. That the absence of ice upon the refrigerant pipes results in a considerable saving of refrigerant over those devices in which ice is formed thereon.

D. That the maximum refrigerating effect is obtained.

E. That ice can be formed upon the thermal conducting member and the beer pipes only, and hence the full effect of the refrigerant is directed to the refrigerating step of process.

F. That the full effect of the refrigerant is spread evenly over the thermal conducting element and hence evenly over the beer pipes.

G. That the formation of ice can be reduced to a minimum by retaining the refrigerating element in as closed condition as possible.

H. That during a period of interruption of the flow of the refrigerant, the refrigerating effect upon the beer will be greater than in those devices in which both the refrigerant pipes and the refrigerating pipes are in the same chamber.

I. That the chamber containing the refrigerating pipes only can be more readily cleaned than those devices containing both the refrigerant pipes and the refrigerating pipes.

The above mentioned, and other, valuable features of the devices of my invention are evident from a consideration of its construction and method of use.

I do not limit my invention to devices suitable for the refrigeration of beer, as it is evident they are adapted for treatment of other liquids.

I do not limit myself to the particular size, number, arrangement or material of parts particularly described as changes may be made therein without going beyond the scope of my invention.

What I claim is:

1. In a device adapted for the refrigerating of liquid, in combination, means including a thermal conducting wall defining a dry refrigerating chamber, a continuous conduit for conveying a liquid through said refrigerating chamber, means including an outer insulating wall defining a refrigerant chamber contiguous to said refrigerating chamber means and having said thermal conducting wall common therewith, a second continuous conduit in said refrigerant chamber fixedly attached to said conducting wall for conveying a refrigerant therethrough, plastic insulating means in said refrigerant chamber for covering all exposed surfaces of said second conduit and inner faces of said thermal conducting wall and outer insulating wall, and laminated insulating means fixedly attached to the exterior surface of said outer insulating wall, said insulating means in said refrigerant chamber, outer insulating wall, and laminated insulating means being arranged to prevent the formation of ice upon the refrigerant conduit and to localize heat transfer between the two chambers.

2. In a device in accordance with claim 1, in which said laminated insulating means comprises a cork member covered with asphalt in abutment with said outer wall and a rigid insulating member covered with asphalt in abutment with the cork member.

3. In a device in accordance with claim 1, in which said plastic insulating means within said refrigerant chamber comprises asphalt.

FRED BUCHHORN.

REFERENCES CITED

The following references are of record in the file of this patent:

UNITED STATES PATENTS

| Number | Name | Date |
|---|---|---|
| 2,102,171 | Vandoren | Dec. 14, 1937 |
| 2,254,225 | Kleist | Sept. 2, 1941 |
| 2,327,355 | Kleist | Aug. 24, 1943 |
| 2,356,068 | Larsson | Aug. 15, 1944 |
| 2,377,296 | Greene | May 29, 1945 |
| 2,437,257 | Johnson | Mar. 9, 1948 |